US008110643B2

(12) United States Patent
Carpentier et al.

(10) Patent No.: US 8,110,643 B2
(45) Date of Patent: Feb. 7, 2012

(54) PREPARATION OF STYRENE HOMOPOLYMERS AND STYRENE-ETHLYENE COPOLYMERS

(75) Inventors: Jean-François Carpentier, Acigne (FR); Evgueni Kirllov, Rennes (FR); Abbas Razavi, Mons (BE); Anne-Sophie Rodrigues, Rennes (FR)

(73) Assignee: Total Petrochemicals Research Feluy, Seneffe (Feluy) (BE)

( * ) Notice: Subject to any disclaimer, the term of this patent is extended or adjusted under 35 U.S.C. 154(b) by 634 days.

(21) Appl. No.: 10/594,471

(22) PCT Filed: Mar. 24, 2005

(86) PCT No.: PCT/EP2005/051369
§ 371 (c)(1),
(2), (4) Date: Jul. 31, 2008

(87) PCT Pub. No.: WO2005/095470
PCT Pub. Date: Oct. 13, 2005

(65) Prior Publication Data
US 2011/0098424 A1    Apr. 28, 2011

(30) Foreign Application Priority Data
Mar. 31, 2004    (EP) ..................... 04290847

(51) Int. Cl.
C08F 4/52       (2006.01)
C08F 212/08    (2006.01)
(52) U.S. Cl. ......... 526/347; 526/170; 526/943; 502/152
(58) Field of Classification Search ............... 526/170, 526/347, 943; 502/152
See application file for complete search history.

(56) References Cited

FOREIGN PATENT DOCUMENTS

| EP | 0417313 A1 | 3/1991 |
| JP | 07258319 A | 10/1995 |
| WO | WO2004/060942 | 7/2004 |
| WO | WO2004/067591 | 8/2004 |

OTHER PUBLICATIONS

Fell, Florian, et al.; "New Stereochemical Assignments of 13C NMR Signals for Predominantly Syndiotactic Polystyrene"; Apr. 10, 2003.
De Rosa, Claudio, at al.; "Structure of Syndiotactic Propylene-Ethylene Copolymers: Effect of the Presence of Ethylene Units on the Structural Transitions During Plastic Deformation and Annealing of Syndiotactic Polypropylene"; Polymer 47 (2006); 2179-2188.
Tynys, A., at al.; "Copolymerisation of 1,9-decadiene and propylene with binary and isolated metallocene systems"; Polymer 48 (2007); 2793-2805.
Ko, Young Soo, et al.; "- Kinetic studies on the syndiotactic propylene polymerization catalyzed over iPr(Cp)(Flu)ZrCl2"; European Polymer Journal 39(2003);1609-1614.

*Primary Examiner* — Caixia Lu (57) ABSTRACT

The present invention discloses copolymers of styrene and ethylene with highly syndiotactic styrene blocks prepared with of a catalyst system comprising a metallocene catalyst component of the general formula (I): (Flu-R"—C p)M($n^3$-$C_3R'_5$)(ether)$_n$ wherein Cp is a cyclopentadienyl, substituted or unsubstituted, Flu is a fluorenyl, substituted or unsubstituted, M is a metal Group III of the Periodic Table, ether is a donor solvent molecule, R" is a structural bridge between Cp and Flu (9 position) imparting stereorigidity to the component, each R' is the same or different and is hydrogen or an hydrocarbyl having from 1 to 20 carbon atoms and n is 0, 1 or 2. It also discloses styrene-ethylene copolymers having a high styrene content in which styrene units form syndiotactic polystyrene blocks.

21 Claims, 10 Drawing Sheets

PREPARATION OF STYRENE HOMOPOLYMERS AND STYRENE-ETHLYENE COPOLYMERS

This invention relates to the field of homopolymerisation of styrene or copolymerisation of styrene and ethylene using allyl complexes of group 3 metals incorporating bridged cyclopentadienyl-fluorenyl ligands.

Ishiara et al. (Ishihara, N.; Seimiya, T.; Kuramoto, M.; Uoi, M in *Macromolecules* 1986, 19, 2464) were the first to report catalyst systems that were active in the preparation of highly syndiotactic polystyrene (sPS). These catalysts were based on hemimetallocene complexes of titanium activated by organoaluminum derivatives such as methylalumoxane (MAO).

Many efforts have been paid to expand the chemistry of half-sandwich titanocenes CpTiX$_3$ in the polymerisation of styrene such as for example Ishihara et al. (Ishihara, N.; Kuramoto, M.; Uoi, M. in *Macromolecules* 1988, 21, 3356 and references therein) or Pellechia et al. (Pellecchia, C.; Pappalardo, D.; Oliva, L.; Zambelli, A. in *J. Am. Chem. Soc.* 1995, 117, 6593 and references therein) or Wang et al. (Wang, Q.; Quyoum, R.; Gillis, D. J.; Tudoret, M.-J.; Jeremic, D.; Hunter, B. K.; Baird, M. G. in *Organometallics* 1996, 15, 693) or Knjazhanski et al. (Knjazhanski, S. Ya.; Cadenas, G.; Garcia, M.; Perez, C. M.; Nifant'ev, I. E.; Kashulin, I. A.; Ivchenko, P. V.; Lyssenko, K. in *Organometallics* 2002, 21, 3094).

Alternatives to cyclopentadienyl derivatives have also been investigated such as for example in Zambelli et al. (Zambelli, A.; Oliva, L.; Pellecchia, C. in *Macromolecules* 1989, 22, 2129) or in Liguori et al. (Liguori, D.; Centore, R.; Tuzi, A.; Grisi, F.; Sessa, I.; Zambelli, A. in *Macromolecules* 2003, 36, 5451).

Styrene polymerisation mediated by organometallic species of group 3 metals has been much less explored, and only a few examples of lanthanide-based catalysts have appeared to be significantly active for this purpose. The half-sandwich "constrained geometry" yttrium alkyl complex [(C$_5$Me$_4$—SiMe$_2$—N$^t$Bu)Y(μ-C$_6$H$_{13}$)(THF)]$_2$ gave, with moderate activity, atactic polystyrene (PS) with a number average molecular weight Mn of up to 61,000 and a polydispersity D of from 1.10 to 1.23. The polydispersity D is defined by the ratio Mw/Mn of the weight average molecular weight Mw over the number average molecular weight Mn (Hultzsch, K. C.; Voth, P.; Beckerle, K.; Spaniol, T. P.; Okuda, J. in *Organometallics* 2000, 19, 228).

The complex (C$_5$Me$_5$)La(CH(SiMe$_3$)$_2$)$_2$(THF) gave, with even lower activity, syndiotactic-enriched PS (rr of about 50%) with a number average molecular weight Mn of less than 16,000 and a polydispersity D of 1.6 (Tanaka, K.; Furo, M.; Ihara, E.; Yasuda, H.; in *J. Polym. Sci. A: Polym. Chem.* 2001, 39, 1382).

Sluggish styrene polymerisation activity was reported for [(tBuC$_5$H$_4$)$_2$LnMe]$_2$ (Ln=Pr, Nd, Gd) by Shen (Shen, Z. in *Polym. J.* 1990, 22, 919) or for [(tBuC$_5$H$_4$)$_2$Yb(THF)$_2$][BPh$_4$] by Yuan et al. (Yuan, F.; Shen, Q.; Sun, J. in *J. Organomet. Chem.* 1997, 538, 241) or for [Eu(CH$_3$CN)$_3$(BF$_4$)$_3$]$_n$ by Thomas et al. (Thomas, R. R.; Chebolu, V.; Sen, A. in *J. Am. Chem. Soc.* 1986, 108, 4096) or for (tBuC$_5$H$_4$)$_2$Yb(μ-H)$_2$AlH(Et$_2$O)) by Khvostov et al. (Khvostov, A. V.; Belsky, V. K.; Sizov, A. I.; Bulychev, B. M.; Ivchenko, N. B. in *J. Organomet. Chem.* 1997, 531, 19) or for the (C$_5$Me$_5$)$_2$NdCl$_2$Li(Et$_2$O)$_2$In—Bu$_2$Mg system by Bogaert et al. (Bogaert, S.; Carpentier, J.-F.; Chenal, T.; Mortreux, A.; Ricart, G. in *Macromol. Chem. Phys.* 2000, 201, 1813). All these complexes gave atactic styrene polymers.

Up to now, the highest activity among organolanthanides was ascertained to polymeric Sm(II) derivatives [Sm(R)(THF)$_x$(C$_5$Me$_5$)$_2$K(THF)]$_n$ wherein R was selected from CH(SiMe$_3$)$_2$, SiH$_3$, OAr, SAr, PHAr or N(SiMe$_3$)$_2$). The resulting polymers were atactic, had a number average molecular weight Mn ranging 82,000 to 350,000 and a polydispersity of from 1.45 to 2.45 (Hou, Z.; Zhang, Y.; Tezuka, H.; Xie, P.; Tardif, O.; Koizumi, T.-A.; Yamazaki, H.; Wakatsuki, Y. in *J. Am. Chem. Soc.* 2000, 122, 10533).

Allyl complexes such as Ln(C$_3$H$_5$)$_3$(Solv)$_n$, [Ln(C$_3$H$_5$)$_4$]Li(Solv)$_n$, [(Cp-CMe$_2$CMe$_2$-Cp)Ln(C$_3$H$_5$)]Li(Solv)$_n$ and (CpCMe$_2$CMe$_2$Cp)Ln(C$_3$H$_5$) wherein Ln is Nd or Sm have been reported to produce syndiotactic-rich (rrrr<70%) or isotactic-rich (mmmm<80%) polystyrene with number average molecular weight Mn ranging from 5,000 to 320,000 and polydispersity D of from 1.3 to 4.7 (Baudry-Barbier, D.; Camus, E.; Dormond, A.; Visseaux, M. in *Appl. Organomet. Chem.* 1999, 13, 813).

None of the complexes disclosed so far have been able to achieve controlled highly stereospecific polymerisation of styrene.

It is an aim of this invention to provide a catalyst system that is active in the homo- or co-polymerisation of styrene without co-catalyst.

It is also an aim of the present invention to provide a catalyst system able to prepare highly syndiotactic polystyrene.

It is a further aim of the present invention to provide a catalyst system able to prepare styrene-ethylene copolymers having a large percentage of styrene.

It is yet a further aim of the present invention to provide a catalyst system able to prepare styrene-ethylene copolymers having single ethylene units dispersed in the polymeric chain.

It is another aim of the present invention to provide a catalyst system able to prepare styrene-ethylene copolymers having an alternated ethylene-styrene structure.

Accordingly, the present invention discloses styrene-ethylene copolymers with either highly syndiotactic styrene blocks when the amount of styrene in the copolymer is of more than 90 mol % up to 99.5 mol % or alternated ethylene-styrene structures when the amount of styrene in the copolymer is of from 45 to 90 mol %, said copolymers being prepared with a catalyst system comprising a metallocene catalyst component of the general formula $$(\text{Flu-R''-Cp})M(\eta^3\text{-C}_3R'_5)(\text{ether})_n \quad (I)$$

wherein Cp is a cyclopentadienyl, substituted or unsubstituted, Flu is a fluorenyl, substituted or unsubstituted, M is a metal Group 3 of the Periodic Table, R" is a structural bridge between Cp and Flu (9-position) imparting stereorigidity to the component, ether is a donor solvent molecule, each R' is the same or different and is hydrogen or an hydrocarbyl having from 1 to 20 carbon atoms and n is 0, 1 or 2.

The catalyst system of the present invention does not require the use of an activating agent or co-catalyst.

Preferably the styrene-ethylene copolymer contains from 75, more preferably from 85 to 90 mol % of styrene for preparing copolymers having alternated ethylene-styrene structures. For producing the styrene-ethylene copolymer having highly syndiotactic styrene blocks, the amount of styrene is preferably of at from 95 to 99 mol %.

The substituents on the cyclopentadienyl are not particularly limited, they can be the same or different and they include hydrocarbyls having from 1 to 20 carbon atoms and silyl groups SiR'$_3$ wherein R' is defined as before as hydrogen or an hydrocarbyl having from 1 to 20 carbon atoms.

The substituents on the fluorenyl are not particularly limited, they can be the same or different and they include hydrocarbyls having from 1 to 20 carbon atoms and silyl groups $SiR'_3$.

In the allyl group $C_3R'_5$, R' includes hydrogen or an hydrocarbyl having from 1 to 20 carbon atoms. It may also include a silyl group or a polybutadienyl chain.

The type of bridge present between the cyclopentadienyl and the fluorenyl in the above-described catalysts is not itself particularly limited. Typically R" comprises an alkylidene group having 1 to 20 carbon atoms, a germanium group (e.g. a dialkyl germanium group), a silicon group (e.g. a dialkyl silicon group), a siloxane group (e.g. a dialkyl siloxane group), an alkyl phosphine group or an amine group. Preferably, the substituent comprises a silyl radical or a hydrocarbyl radical having at least one carbon atom, to form the bridge, or a substituted or unsubstituted ethylenyl radical (e.g. $—CH_2CH_2—$). More preferably R" is isopropylidene ($Me_2C$), $Ph_2C$, ethylenyl ($CH_2CH_2$), $Me_2Si$, or $Ph_2Si$, and most preferably R" is ($Me_2C$).

M is preferably yttrium, lanthanum or a member of the lanthanide series. Throughout this description, the term "lanthanide series" means the rare earth series of elements having atomic numbers of from 58 to 71. M is preferably yttrium, lanthanum, neodymium or samarium. More preferably, M is neodymium.

The ether is generally a donor solvent molecule. Ether is preferably an acyclic or a cyclic aliphatic ether, such as diethylether ($Et_2O$) or tetrahydrofurane (THF). Preferably the ether is tetrahydrofurane.

The preparation of the neutral allyl yttrium complex [Flu-R"-Cp]Y(2-R—C$_3$H$_4$)(THF) is carried out by reacting the anionic complex [(Cp-R"-Flu)YCl$_2$]$^-$[Li(ether)$_4$]$^+$ wherein ether is $Et_2O$ or THF with one equivalent with respect to Y of ClMgC$_3$H$_5$ if R is hydrogen or with the methallyl Grignard reagent ClMg(2-Me-allyl) if R is Me.

Figure 1:
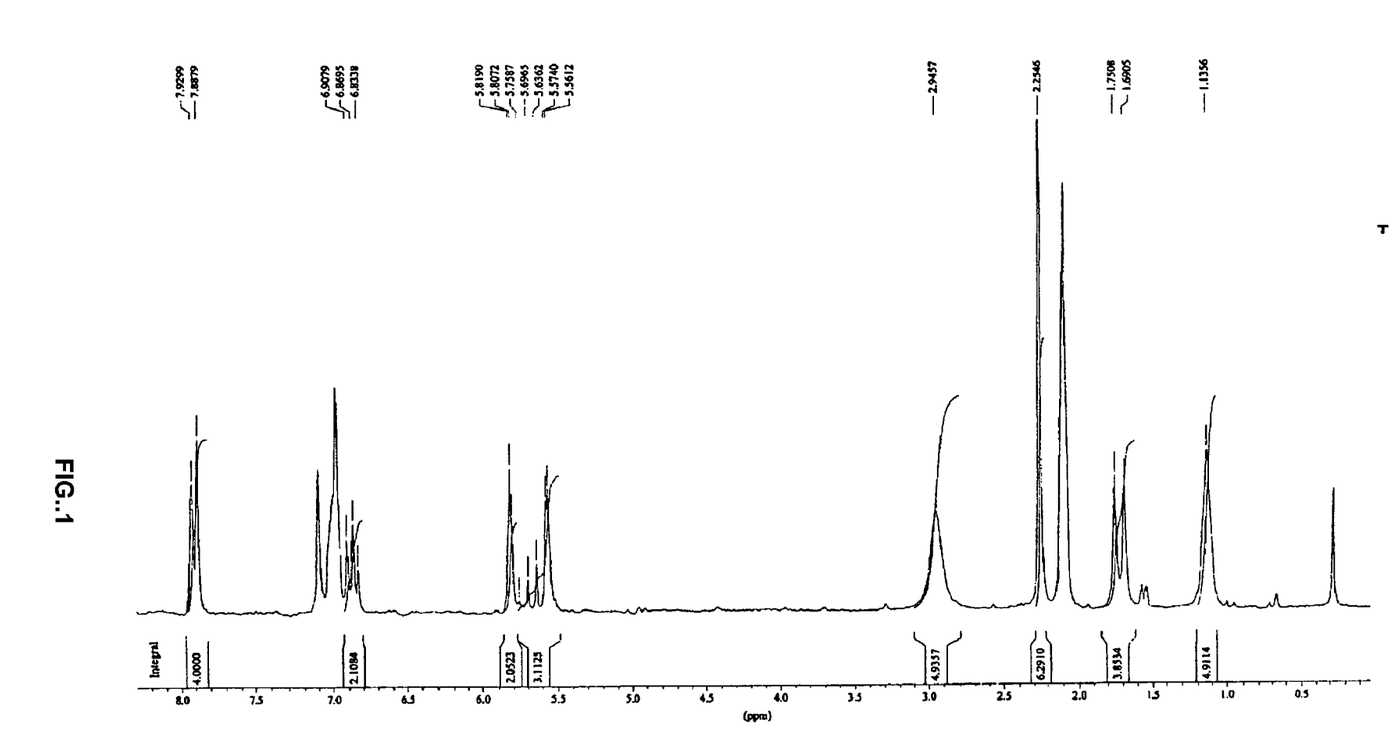
FIG. 1 represents the $^1H$ NMR spectrum of complex [Flu-CMe$_2$-Cp]Y($C_3H_5$)(THF) in toluene.
Figure 2:
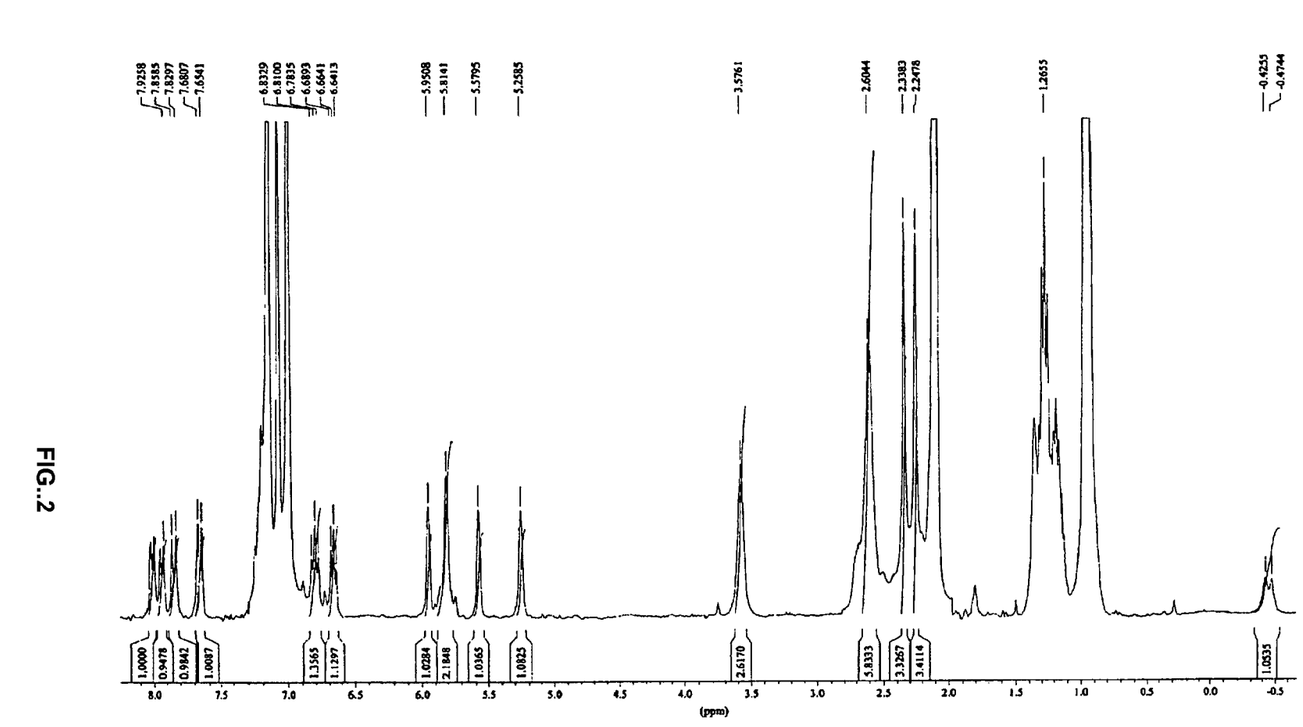
FIG. 2 represents the $^1H$ NMR spectrum of complex [Flu-CMe$_2$-Cp]Y($C_3H_5$)(THF) in toluene at a temperature of $-70°$ C.

The $^1H$ NMR characteristics for the Y complex, both in toluene (displayed in FIG. 1) and in THF at room temperature wherein R is H and R" is CMe$_2$, are consistent with a symmetric structure in solution and include resonances for a symmetrically coordinated Cp-CMe$_2$-Flu ligand, a coordinated THF molecule and an allyl ligand. In the $^{13}C\{^1H\}$ NMR spectrum (at 25° C. and in toluene-d$_8$) the bridgehead carbon atom of the fluorenyl moiety appears at 93.8 ppm. This value is to be compared to the chemical shift of 95.9 ppm reported for the corresponding carbon in [($\eta^5,\eta^3$-Cp-CMe$_2$-Flu)Zr($\mu$-H)(Cl)]$_2$ or to the value of 103.5 ppm in [$\eta^3,\eta^5$-Flu-CMe$_2$-Cp)($\eta^1,\eta^5$-Flu-CMe$_2$-Cp)Y]$^-$[Li(Et$_2$O)(THF)$_3$]$^+$, or also to the value of 95.9 ppm in [($\eta^3,\eta^5$-Flu-CMe$_2$-Cp)$_2$La]$^-$[Li(OEt$_2$)$_2$]$^+$. This suggests that reduced ($\eta^3$-) coordination of the fluorenyl ligand occurs in complex II in solution. The low temperature ($-70°$ C.) $^1H$ NMR spectrum displayed in FIG. 2 suggests that the allyl moiety quantitatively, and reversibly upon heating, interconverts to a pseudo-alkyl form, consistent with a $\eta^3 \rightarrow \eta^1$ haptotropic shift as investigated for example by Yoder et al. (Yoder, J. C.; Day, M. W.; Bercaw, J. E., in *Organometallics*, 1998, 17, 4946) or by Abrams et al. (Abrams, M. B.; Yoder, J. C.; Loeber, C.; Day, M. W.; Bercaw, J. E., in *Organometallics*, 1999, 18, 1389) for a set of ansa-biscyclopentadienyl scandium and yttrium allyls. FIG. 2 shows that this low temperature form is dissymmetric on the NMR time-scale showing eight sharp resonances for the Flu moiety, four resonances for the Cp moiety, and two resonances for the isopropylidene bridge methyl groups. The terminal alkyl fragment —CH$_2$—CH═CH$_2$ is presented by a set of three resonances that includes a signal at $\delta$=5.81 ppm for the methine protons that overlaps with one CpH resonance, a broad singlet at $\delta$=3.62 ppm for the terminal methylene group, and two broad signals at $\delta$=−0.38 and −0.43 ppm for the two diastereotopic protons of the methylene group connected to the metal center.

The early lanthanide complexes are prepared in a similar manner by salt elimination reaction of the dilithium salt [Flu-R"-Cp]Li$_2$ with one equivalent of LnCl$_3$(THF)$_x$ as illustrated in scheme 1 wherein R" is CMe$_2$.

Scheme 1

(2)

Preferably, Ln is lanthanum, neodymium or samarium.

Figure 3:
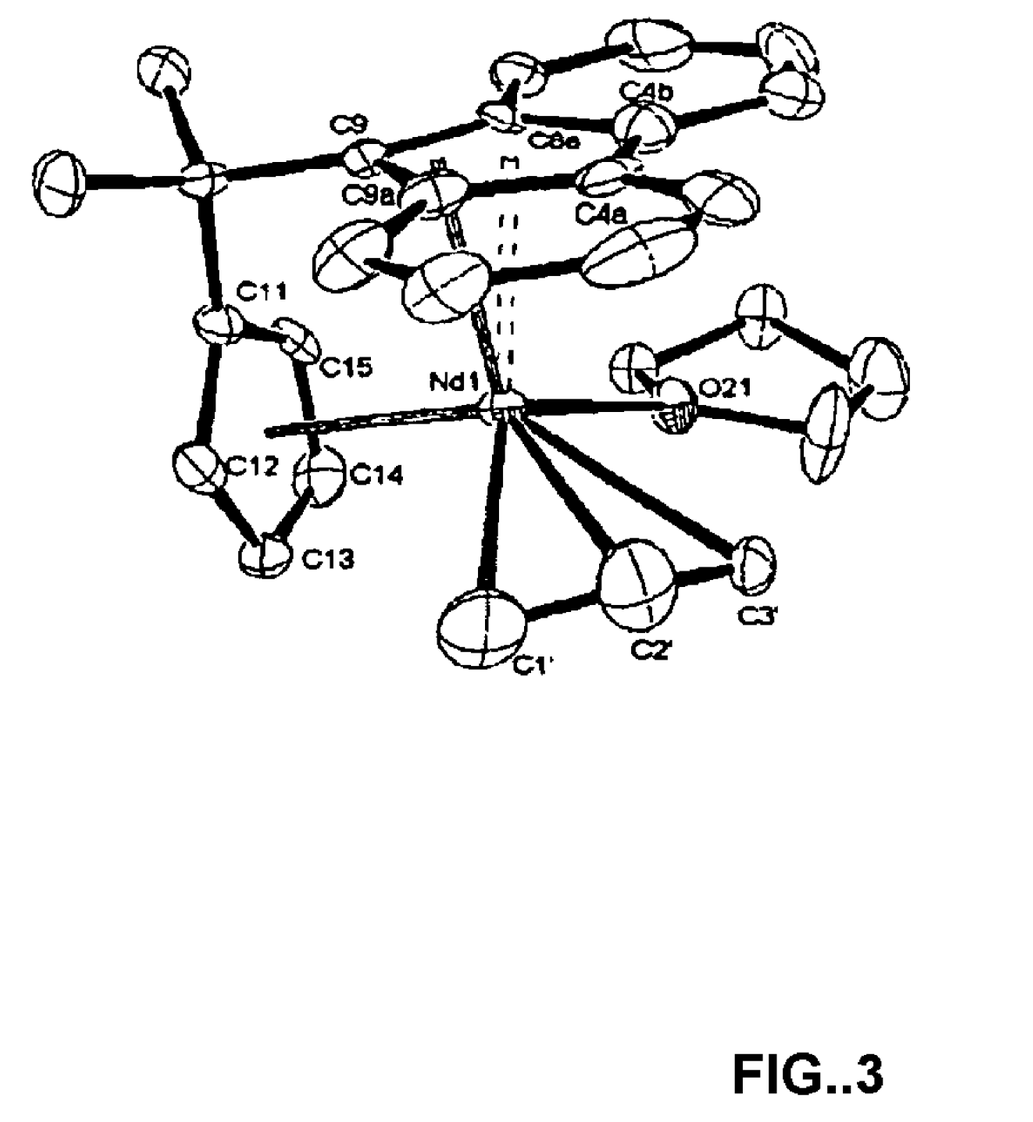
FIG. 3 represents the crystal structure of (Flu-CMe$_2$-Cp)Nd($C_3H_5$)(THF).

The crystal structure of the complex based on neodymium and determined by X-ray diffraction pattern is represented in FIG. 3.

The cyclopentadienyl ligand may be substituted. The synthesis of substituted complexes is carried out directly from the modified (substituted) ligand (R'C$_5$H$_3$)H—R"-FluH in order to prepare the corresponding allyl complex as shown for example in scheme 2 wherein R" is CMe$_2$, R' is H, the Cp is substituted at the 3-position by a tert-butyl group, the metal is Y, and ether is THF.

Scheme 2

Figure 4:
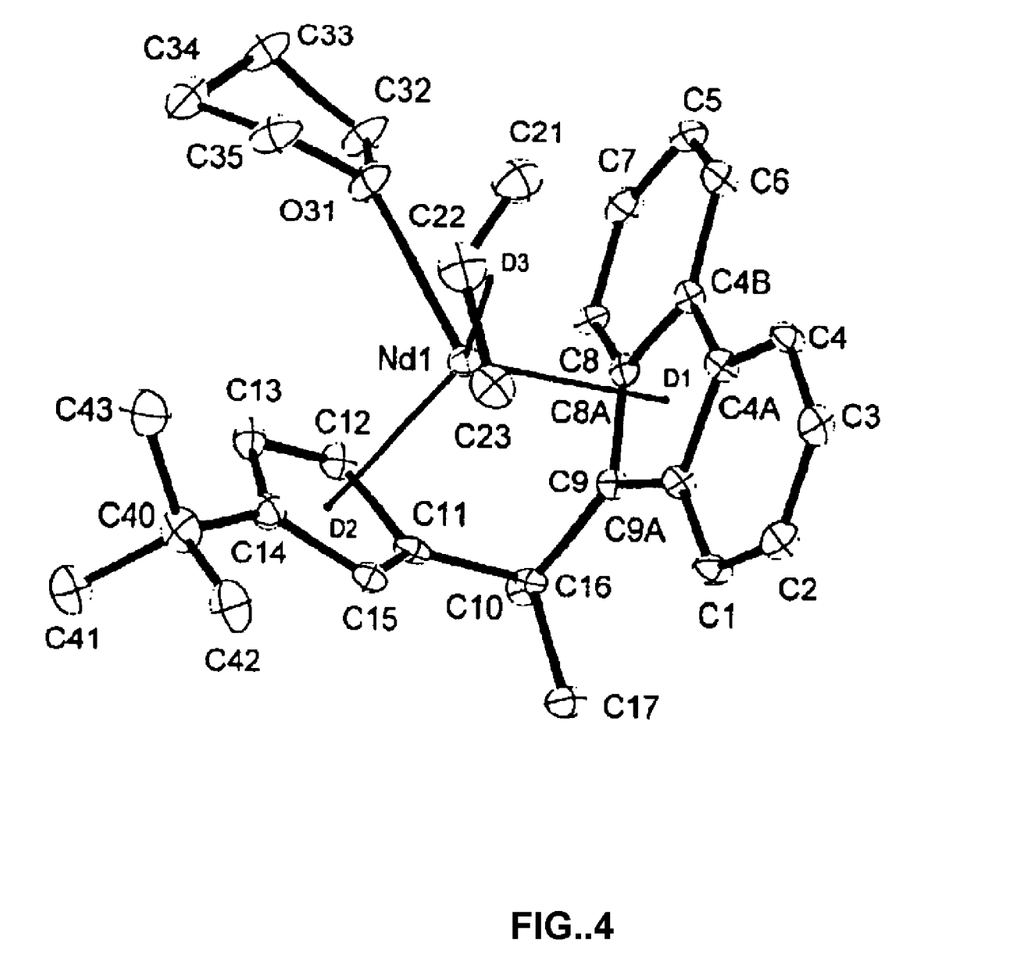
FIG. 4 represents the crystal structure of [(3-tBu-C$_5$H$_3$)—CMe$_2$-Flu]Nd(allyl)(THF).

FIG. 4 represents the crystal structure of [(3-tBu-C$_5$H$_3$)—CMe$_2$-Flu]Nd(allyl)(THF).

All these allyl complexes are active in the polymerisation of styrene, under mild conditions, and without activating agent or co-catalyst. The resulting polystyrene is highly syndiotactic. Mild conditions imply that the polymerisation is carried out either in toluene solution or in bulk and at temperatures ranging from 10 to 120° C., preferably from 15 to 80° C. and more preferably from 20 to 60° C. The activities vary with the Group 3 metal selected and ranking them in order of increasing activity, the yttrium has the lowest activity, followed by lanthanum, samarium and neodymium that has the highest activity. It must be noted that the activity trend does not follow the order of metal atomic radii. It can be speculated that it reflects, in part, the stability of the complex under polymerisation conditions.

Figure 5:
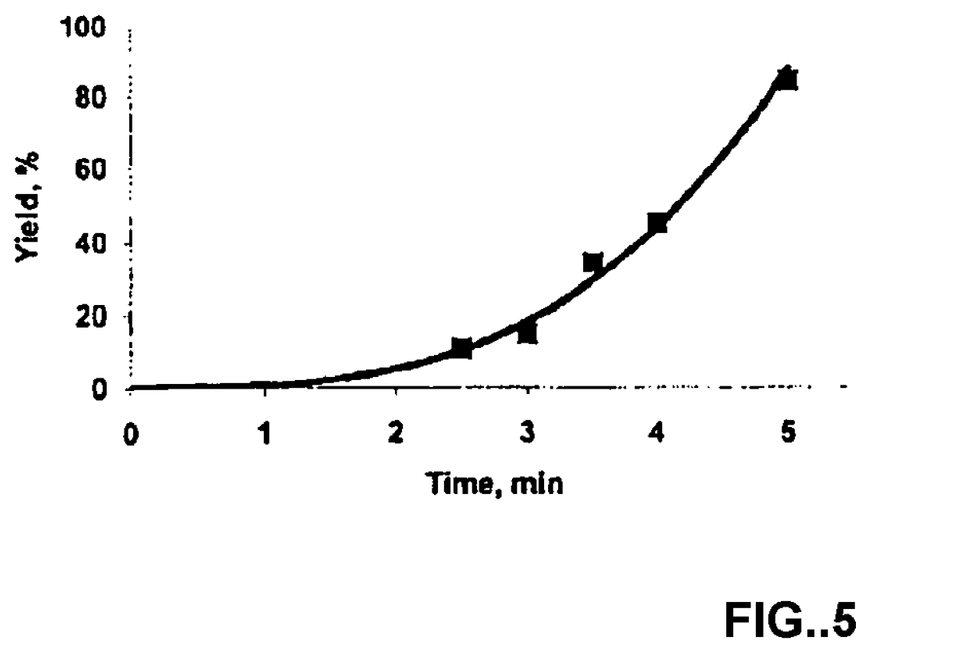
FIG. 5 represents the yield expressed in % as a function of time expressed in minutes for the bulk polymerisation of styrene in the presence of the allyl complex (Flu-CMe$_2$-Cp)Nd($C_3H_5$)(THF) at a polymerisation temperature of 60° C. and a [Styrene]-to-[Nd] ratio of 600.

The styrene polymerisation reactions mediated by these allyl complexes all feature an induction period as seen in FIG. 5 representing the yield as a function of polymerisation time for a complex based on neodymium. In addition, it is observed that when the polymerisation temperature is increased from 50° C. to 60° C., a significant increase in activity is observed, which is greater than that expected from the simple influence of temperature on kinetics. These observations suggest the existence of a pre-activation step, possibly related to dissociation of a THF molecule from the metal center in the pre-catalyst. Polymerisations of bulk styrene led to 70-85% maximum monomer conversions. Since sPS is not soluble under the reaction conditions and precipitates during polymerisation, mass transfer limitations likely take place, which may eventually cause reduction of the polymer yield. At the same time, introduction of toluene in the polymerisation medium, which can act as a solvent for the monomer, is detrimental for catalyst activity. This can stem from competitive coordination of toluene onto the metal center that blocks the subsequent attack of the π-system of the styrene vinyl group. Polymerisation is thus preferably carried out without solvent or with cyclohexane.

The number average molecular weight Mn of the polymers obtained with these systems is in the range 10,000 up to 300,000, preferably up to 200,000 and more preferably up to 150,000 g·mol$^{-1}$. The polydispersity is narrow and typically ranges from 1.1 to 3.5, preferably from 1.2 to 3, indicating a single-site behavior of the catalyst. Large polydispersities ranging from 2 to 6 have been observed for polystyrene samples produced over long periods: this behavior may arise from a gradual catalyst decomposition with time. For polydispersities smaller than 1.3, the experimental values of the number average molecular weight Mn are usually somewhat higher than the calculated values, reflecting a moderate initiation efficiency.

Figure 6:
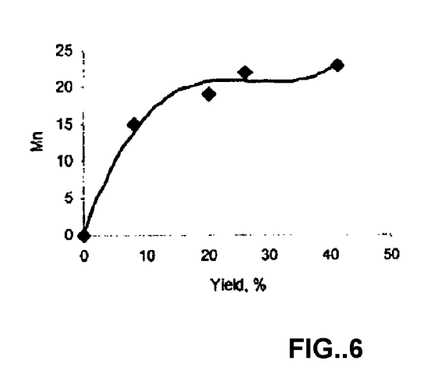
FIG. 6 represents the number average molecular weight Mn as a function of yield in % for a polystyrene prepared with the neodymium complex (Flu-CMe$_2$-Cp)Nd($C_3H_5$)(THF) at a temperature of 60° C., in bulk polymerisation and with a [Styrene]-to-[Nd] ratio of 600.
Figure 7:
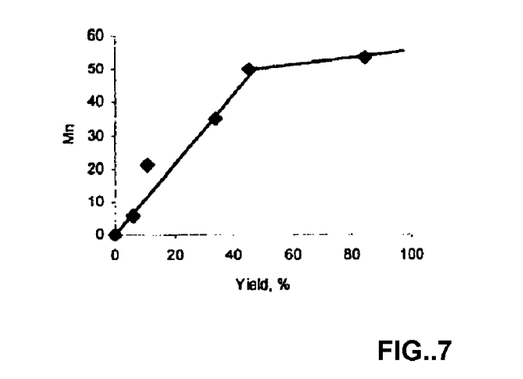
FIG. 7 represents the $^{13}C\{^1H\}$ NMR spectrum of a non-fractionated polymer of styrene obtained with the neodymium complex (Flu-CMe$_2$-Cp)Nd($C_3H_5$)(THF).

FIGS. 6 and 7 represent respectively the molecular weights Mn as a function of yield of the polymer for polymerisation reactions using the yttrium and neodymium complexes wherein R" is CMe$_2$, R' is H, and ether is THF. These appear approximately linear in the first stage of the polymerisation but show afterwards a saturation limit.

Figure 8:
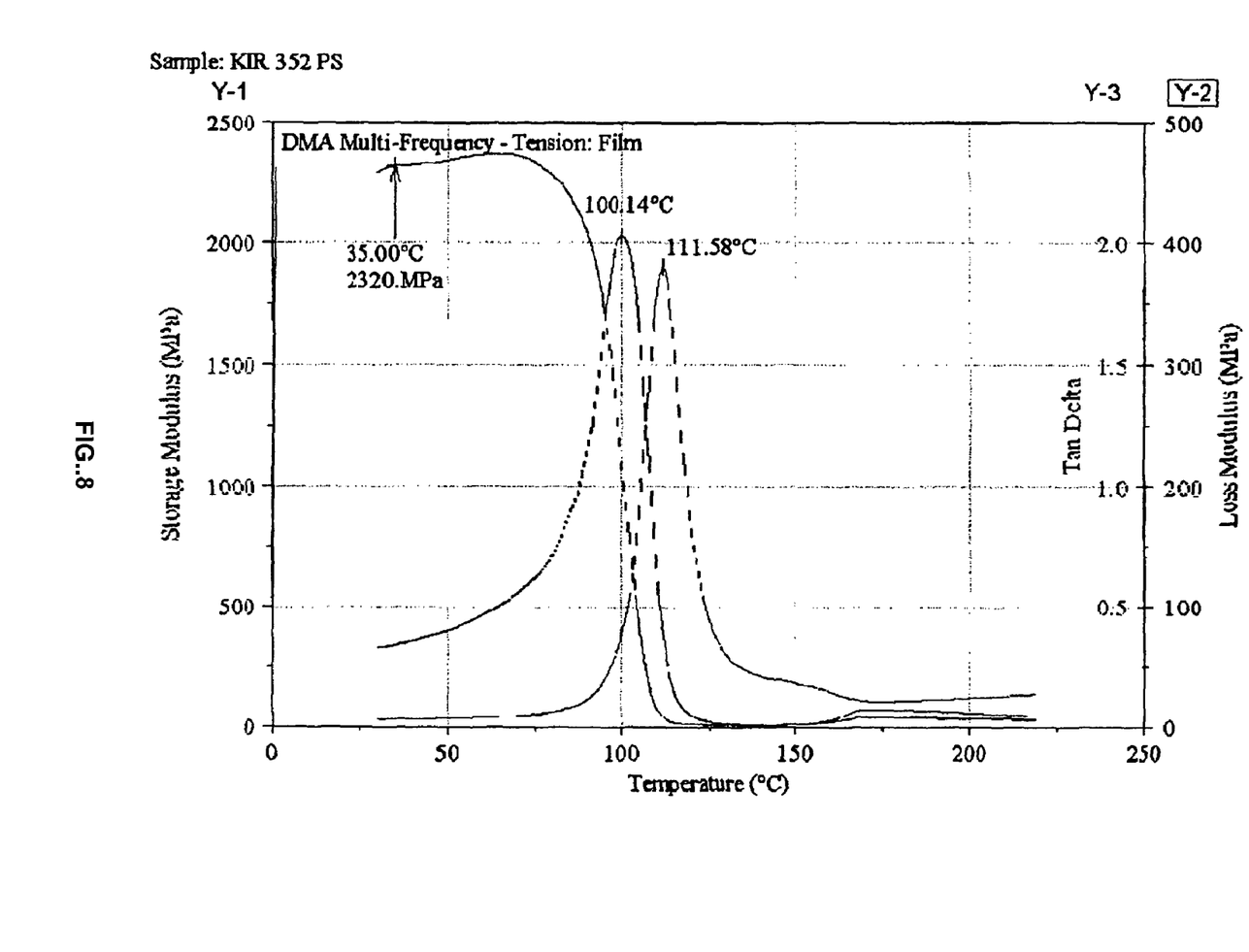
FIG. 8 represents the Dynamic Mechanical Analysis (DMA) diagram for a syndiotactic polystyrene prepared with the neodymium complex (Flu-CMe$_2$-Cp)Nd($C_3H_5$)(THF).
Figure 9:
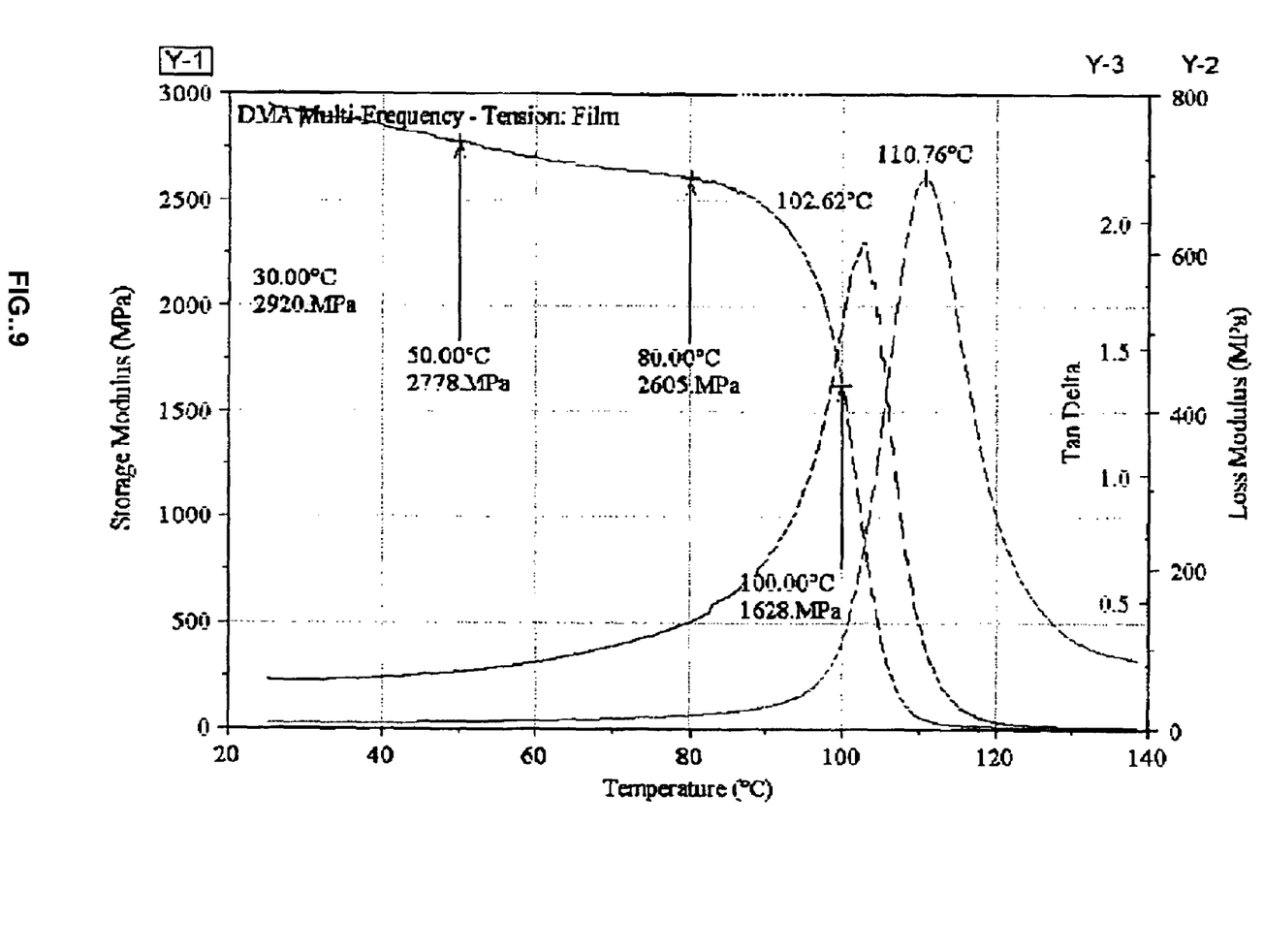
FIG. 9 represents the DMA diagram for a syndiotactic polystyrene prepared with a CpTiCl$_3$/MAO catalyst system.
Figure 10:
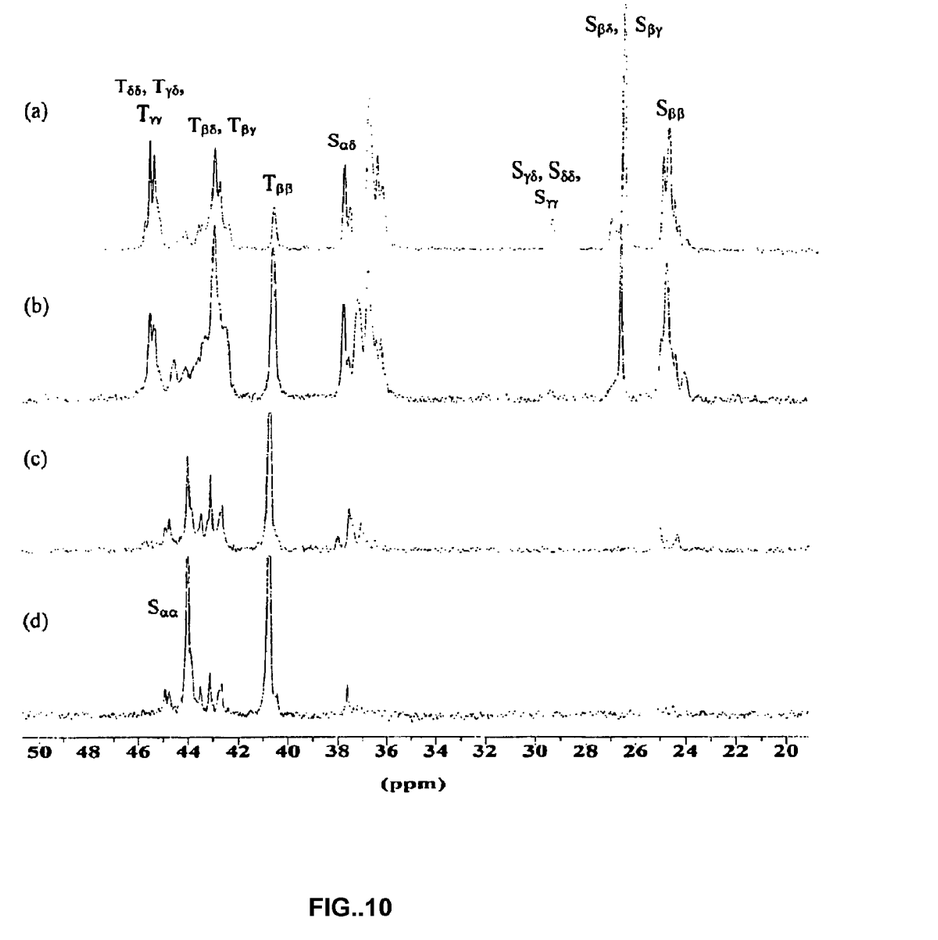
FIG. 10 represents the methylene and methine region of the $^{13}C\{^1H\}$ NMR spectra (75-125 MHz, at 25° C., in CDCl$_3$) of ethylene-styrene copolymers obtained with the neodymium complex (Flu-CMe$_2$-Cp)Nd($C_3H_5$)(THF). and having respectively a styrene content of about 45 mol % for (a), of about 60 mol % for (b), of about 84 mol % for (c) and of about 95 mol % for (d).

The microstructure of the polystyrene obtained with these allyl-lanthanide complexes is highly syndiotactic. A typical $^{13}$C{$^1$H} NMR spectrum of a non-fractionated (crude) polymer sample obtained with a neodymium complex is shown in FIG. 8, which presents a single sharp resonance at δ=145.5 ppm attributed to the phenyl ipso carbon of syndiotactic polystyrene (sPS), giving a rrrr pentad abundance of at least 90%, preferably of at least 95% and more preferably of at least 98%. High melting temperatures ranging from 250 to 269° C. also confirm the high syndiotacticity of the polystyrene. The glass transition temperature (T$_g$=111.5° C.) and the Young modulus (E=2,320 MPa at 35° C.), both determined by DMA and represented in FIG. 9, compare well with the corresponding values determined under the same conditions (T$_g$=110.8° C.; E=2,920 MPa at 30° C.) for a sPS sample prepared independently with the CpTiCl$_3$/MAO system and represented in FIG. 10.

The allyl complexes of the present invention have little or no activity in the polymerisation of ethylene and the system deactivates rapidly. Some of the complexes, however, particularly those based on neodymium, show significant and persistent activities in the copolymerisation of ethylene with styrene under similar conditions: these activities range from 40 to 280 kg of copolymer per mole of catalyst per hour. The copolymers recovered are soluble at room temperature in THF or in $CHCl_3$ and have number average molecular weights Mn in the range of 10,000 to 200,000 and more preferably from 75,000 to 150,000. They have a polydispersity ranging from 1.1 to 3.5, preferably from 1.4 to 1.85. The amount of styrene incorporated in the copolymers varies over a wide range: it ranges from 10 to 99 mol %, preferably from 45 to 99 mol %, more preferably from 85 to 99 mol %, even more preferably from 90 to 98 mol % and most preferably from 95 to 99 mol %, as determined by $^1H$ NMR: it depends mainly upon the styrene concentration and upon the ethylene pressure. The ethylene-styrene copolymers prepared according to the present invention have amounts of incorporated styrene significantly higher than those obtained with the prior art catalyst systems and the ethylene is randomly distributed in the polymer chain. The copolymers obtained according to the present invention also have a very high Young's modulus, typically indicative of high rigidity. The value of the Young's modulus is in part determined by the polymerisation conditions and by the type of solvent used during polymerisation.

Because of the high styrene content of the copolymer, its solubility in polystyrene is substantially improved.

Figure 11:
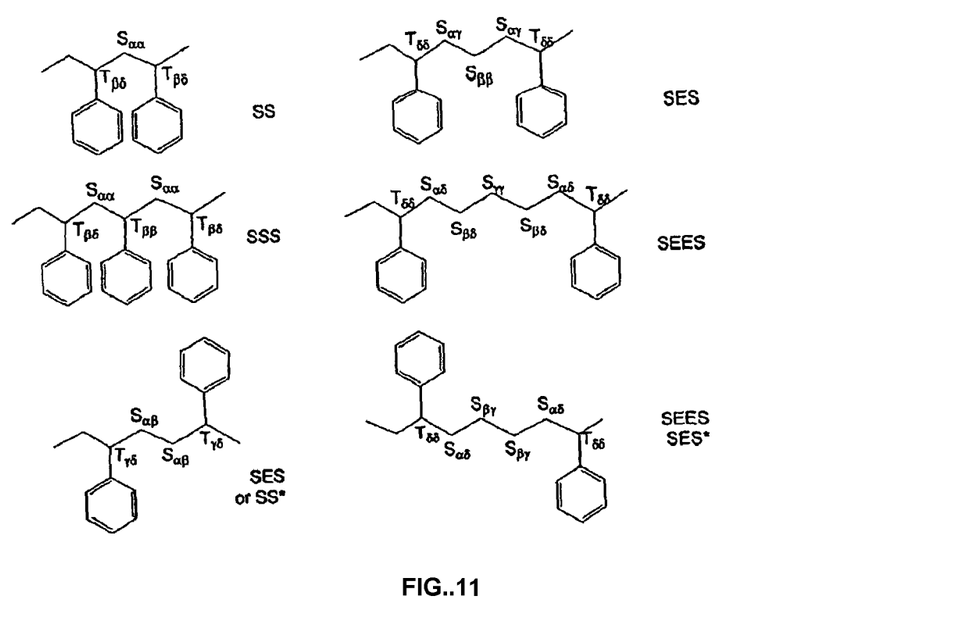
FIG. 11 represents possible configurations of styrene and ethylene units in an ethylene-styrene copolymer.

The microstructure of the ethylene-styrene copolymers is determined by $^{13}C\{^1H\}$ NMR spectroscopy as shown in FIG. 11 and the spectra are consistent with the presence of ethylene units randomly distributed over the polymer chain. For an ethylene-rich copolymer containing about 45 mol % of styrene, several resonances are assigned to the configurations of styrene and ethylene explained in FIG. 12: the sequences observed are respectively SEES ($\delta$=27.1 ppm), ESSE ($\delta$=37.9, 38.1, 43.1 ppm), and ESE ($\delta$=37.1 ppm), and a low intensity resonance attributable to a EEE/EESEE sequence ($\delta$=29.9-30.1 ppm). The latter sequence is no longer observed in the spectra of copolymer samples that have high styrene content as seen in FIGS. 11c and d. For the styrene-rich copolymers, the spectra show an increase in the intensity of the resonances attributable to SSSE and SSSS sequences ($\delta$ 40.7-42.9 ppm). The degree of stereospecificity of the styrene units in the copolymer is determined by $^{13}C\{^1H\}$. NMR: it is observed that the stereocontrol of the styrene insertion increases with increasing styrene feed.

The allyl complexes of the present invention, and particularly neodymium are prominent single-site catalysts for highly syndiospecific polymerisation of styrene. They are also able to prepare ethylene-styrene copolymers having a very high styrene content, randomly distributed ethylene in the polymer chain and very high Young's modulus. In addition these systems have a very high activity.

Without wishing to be bound by a theory, it is speculated that the syndiotactic structure of polystyrene can be attributed to chain end control mechanism in combination with the catalyst component symmetry. Selecting a cyclopentadienyl-fluorenyl catalyst component that does not have a purely Cs symmetry and carries one or more substituents on the cyclopentadienyl or fluorenyl does not destroy the syndiotacticity of the resulting polymer.

EXAMPLES

All manipulations were performed under a purified argon atmosphere using standard Schlenk techniques or in a glove-box. Solvents were distilled from Na/benzophenone (THF, $Et_2O$) and Na/K alloy (toluene, pentane) under nitrogen, degassed thoroughly and stored under nitrogen prior to use. Deuterated solvents (benzene-$d_6$, toluene-$d_8$, THF-$d_8$; >99.5% D, Eurisotop) were vacuum-transferred from Na/K alloy into storage tubes.

$YCl_3(THF)_{3.5}$, $LaCl_3(THF)_{1.5}$ and $SmCl_3(THF)_2$ were obtained after repeated extraction of $YCl_3$, $LaCl_3$ and $SmCl_3$ (Strem) from THF or just prior to use by refluxing the anhydrous lanthanide chloride in THF for 2 h and subsequent evaporation. Ionic complex $[(Cp-CMe_2-Flu)YCl_2]^-[Li(ether)_4]^+$ was prepared as reported by Kirillov et al. (Kirillov, E.; Toupet, L.; Lehmann, C. W.; Razavi, A.; Kahlal, S.; Saillard, J.-Y.; Carpentier, J.-F. in *Organometallics* 2003, 22, 4038).

NMR spectra of complexes and polymers were recorded on Bruker AC-200, AC-300 and AM-500 spectrometers in Teflon-valved NMR tubes at 23° C. unless otherwise indicated. $^1H$ and $^{13}C$ chemical shifts were reported vs. $SiMe_4$ and were determined by reference to the residual solvent peaks. Assignment of resonances for organometallic complexes was made from $^1H$—$^1H$ COSY, $^1H$—$^{13}C$ HMQC and HMBC NMR experiments. Coupling constants are given in Hertz. Elemental analyses were performed by the Microanalytical Laboratory at the Institute of Chemistry of Rennes and are the average of two independent determinations.

Room temperature GPC analysis of polymers was performed in THF with a Waters apparatus. High temperature GPC analyses were carried out in trichlorobenzene at a temperature of from 135 to 155° C. in the research centers of ATOFINA Research in Feluy and in Lacq.

DMA was carried out at the university of Lorient.

Preparation of (Cp-CMe$_2$-Flu)Y(C$_3$H$_5$)(THF).

To a suspension of 0.390 g of ionic complex $[(Cp-CMe_2-Flu)YCl_2]^-[Li(ether)_4]^+$ (1) in 20 mL of toluene, 0.27 mL of a 2.0 M solution in THF of allylmagnesium chloride (0.54 mmol) were added. The reaction mixture was stirred for 8 hours at room temperature (about 25° C.). The resulting yellowish-brown solution was filtered and volatiles were removed in vacuum. The residue was washed twice with 15 mL of pentane and dried in vacuum to give 0.16 g of (Cp-CMe$_2$-Flu)Y(C$_3$H$_5$)(THF) (2) as a yellow powder with a yield of 65%. The $^1H$ NMR (toluene-$d_8$, 200 MHz, 50° C.) spectrum was as follows: $\delta$ 7.90 (d, 4H, $J_{HH}$=7.0, Flu), 7.0-6.8 (m, 4H, Flu), 5.82 (t, 1H, $J_{HH}$=2.6, Cp), 5.59 (t, 1H, $J_{HH}$=2.6, Cp), 3.13 (br m, 4H, α-$CH_2$, THF), 2.45 (br m, 2H, α-$CH_2$, THF), 2.24 (s, 6H, $CH_3$), 1.93 (br m, 4H, $CH_2CHCH_2$), 1.21 (br m, 4H, (3β-$CH_2$, THF). $^{13}C\{^1H\}$ NMR (toluene-$d_8$, 75 MHz, 25° C.): $\delta$ 144.5 ($CH_2CHCH_2$), 130.3 (quat., Cp), 125.3 (quat., Flu), 123.9 (Flu), 121.9 (Flu), 121.6 (Flu), 118.7 (quat., Flu), 117.1 (Flu), 109.6 (Cp), 99.2 (Cp), 93.8 (C-9, Flu), 72.5 (α-$CH_2$, THF), 68.8 ($CH_2CHCH_2$), 40.6 (C($CH_3$)$_2$), 29.7 (C($CH_3$)$_2$), 25.3 (β-$CH_2$, THF). $^1H$ NMR (THF-$d_8$, 300 MHz, −70° C.): $\delta$ 7.93 (d, 2H, $J_{HH}$=7.7, Flu), 7.63 (d, 2H, $J_{HH}$=7.7, Flu), 7.05 (t, 2H, Flu), 6.49 (t, 2H, Flu), 6.23 (s, 2H, Cp), 5.57 (s, 2H, Cp), 4.66 (m, 2H, $J_{HH}$=13.0, $CH_2CHCH_2$) 1.86 (s, 6H, $CH_3$), 1.52 (d, 4H, $J_{HH}$=13.0, $CH_2CHCH_2$). $^{13}C\{^1H\}$ NMR (THF-$d_8$, 75 MHz, −70° C.): $\delta$ 143.2 ($CH_2CHCH_2$), 132.8, 130.8, 125.6, 120.8, 120.3, 110.3, 110.1, 107.1, 106.8, 103.7, 103.5, 98.6 (Flu and Cp), 57.7 ($CH_2CHCH_2$), 38.5 ($CCH_3$). The calculated values for $C_{28}H_{31}OY$ were: C, 71.18; H, 6.61 and the experimental values were: C, 70.85; H, 6.65.

Preparation of (Cp-CMe$_2$-Flu)Y(2-Me-C$_3$H$_4$)(THF).

To a suspension of 0.530 g of product (1) in 20 mL of toluene, 1.46 mL of a 0.5 M solution in THF (0.73 mmol) of 2-methallylmagnesiumchloride were added. The reaction mixture was stirred for 8 hours at room temperature. The resulting red-brown solution was filtered and volatiles were removed in vacuum. The yellow-brown residue was washed twice in 15 mL of toluene and dried in vacuum to give 0.33 g of (Cp-CMe$_2$-Flu)Y(2-Me-C$_3$H$_4$)(THF) (3) as a bright-yellow powder with a yield of 92%. The calculated and experimental values for C$_{29}$H$_{33}$OY were respectively of: C, 71.60; H, 6.84. and of C, 71.28; H, 6.33.

Preparation of (Cp-CMe$_2$-Flu)La(C$_3$H$_5$)(THF).

To a solution of 0.554 g of FluH-CMe$_2$-CpH (2.03 mmol) in 50 mL of diethyl ether at a temperature of −10° C., 2 equivalents of n-BuLi (2.54 mL of a 1.6 M solution in hexane or 4.07 mmol) were added under vigorous stirring. The reaction mixture was allowed to warm to room temperature. The solution turned dark-yellow and after 3 to 4 hours, a yellow crystalline powder precipitated. To this solution of the dilithium salt in ether cooled to a temperature of −20° C., a suspension of 0.792 g of LaCl$_3$(THF)$_2$ (2.03 mmol) in 20 mL of Et$_2$O was added. Upon vigorous stirring and warming to room temperature, the reaction mixture turned pink. The solution was evaporated in vacuum to give a pink solid powder. To the latter 30 mL of toluene were added and a solution of 1.02 mL of a 2.0 M solution in THF of allylmagnesium-chloride (2.04 mmol) was injected by syringe. The reaction mixture was stirred for 8 hours at room temperature. The resulting red-orange solution was filtered and volatiles were removed in vacuum. The residue was recrystallized from a (1:5) THF/toluene mixture and dried in vacuum to give 0.53 g of (Cp-CMe$_2$-Flu)La(C$_3$H$_5$)(THF) (4) as an orange powder with a yield of 50%. The calculated and experimental values for C$_{25}$H$_{31}$LaO were respectively of: C, 64.37; H, 5.98 and of C, 64.05; H, 5.00.

Preparation of (Cp-CMe$_2$-Flu)Nd(C$_3$H$_5$)(THF).

Complex (Cp-CMe$_2$-Flu)Nd(C$_3$H$_5$)(THF) (5) was prepared from 0.554 g of FluH-CMe$_2$-CpH (2.03 mmol), 0.792 g of NdCl$_3$(THF)$_2$ (2.03 mmol) and 1.02 mL of a 2.0 M solution in THF of allylmagnesiumchloride (2.04 mmol) using a similar synthetic procedure as that described above for complex (4) and isolated as 0.920 g of brown-green powder with a yield of 86%. The calculated and experimental values for C$_{28}$H$_{31}$NdO were respectively of: C, 63.72; H, 5.92 and of C, 62.57; H, 5.34.

Preparation of (Cp-CMe$_2$-Flu)Sm(C$_3$H$_5$)(THF).

Complex (Cp-CMe$_2$-Flu)Sm(C$_3$H$_5$)(THF) (6) was prepared from 0.607 g of FluH-CMe$_2$-CpH (2.23 mmol), of 0.893 g of SmCl$_3$(THF)$_2$ (2.23 mmol) and 1.11 mL of a 2.0 M solution in THF of allylmagnesiumchloride (2.23 mmol), using a similar synthetic procedure as that described above for complex (4) and isolated as 1.04 g of brown powder with a yield of 87%. The calculated and experimental values for C$_{28}$H$_{31}$SmO were respectively of: C, 62.99; H, 5.85 and of C, 62.00; H, 5.38.

Preparation of [(3-tBu-C$_5$H$_3$)—CMe$_2$-Flu]YCl(THF).

To a solution of 0.596 g of (3-tBu-CpH)-CMe$_2$-FluH (1.814 mmol) in 50 mL of Et$_2$O at a temperature of −10° C., 2 equiv. of n-BuLi (2.27 mL of a 1.6 M solution in hexane or 3.32 mmol) were added under vigorous stirring. The reaction mixture was warmed to room temperature and the solution turned pink after 4 hours. To this solution of the dilithium salt in ether cooled to a temperature of −20° C. a suspension of 0.812 g of YCl$_3$(THF)$_{3.5}$ (1.814 mmol) in 30 mL of Et$_2$O was added. Upon vigorous stirring and warming to room temperature, the reaction mixture turned bright yellow. This solution was decanted, separated from the precipitate, and volatiles were removed in vacuum to give 0.825 g of [(3-tBu-C$_5$H$_3$)—CMe$_2$-Flu]YCl(THF) (7) as a bright-yellow powder with a yield of 87%. The $^1$H NMR spectrum (300 MHz, toluene-d$_8$, −50° C.) was as follows: δ 8.27 (d, 1H, J$_{HH}$=8.0, Flu), 7.94 (d, 1H, J$_{HH}$=8.0, Flu), 7.80 (d, 1H, J$_{HH}$=8.0, Flu), 7.67 (d, 1H, J$_{HH}$=8.0, Flu), 7.37 (m, 2H, Flu), 6.82 (t, 1H, J$_{HH}$=8.0, Flu), 6.62 (t, 1H, J$_{HH}$=8.0, Flu), 6.12 (br t, 1H, Cp), 5.60 (br t, 1H, Cp), 5.47 (br t, 1H, Cp), 2.76 (dd, 4H, $^2$J$_{HH}$=17.9, $^3$J$_{HH}$=6.8, α-CH$_2$, THF), 2.29 (s, 6H, CMe$_2$), 1.44 (s, 9H, tBu), 0.70 (br m, 4H, β-CH$_2$, THF). $^1$H NMR (200 MHz, toluene-d$_8$, 25° C.) δ 8.16 (m, 1H, Flu), 8.00-7.70 (m, 3H, Flu), 7.35-7.20 (m, 2H, Flu), 6.89 (t, 1H, J$_{HH}$=7.4, Flu), 6.67 (t, 1H, J$_{HH}$=7.4, Flu), 6.09 (br t, 1H, Cp), 5.57 (m, 2H, Cp), 3.08 (br m, 4H, α-CH$_2$, THF), 2.29 (s, 6H, CMe$_2$), 1.34 (s, 9H, tBu), 1.08 (br m, 4H, β-CH$_2$, THF). $^{13}$C{$^1$H} NMR (toluene-d$_8$, 75 MHz, 25° C.): δ 142.1 (quat. Cp), 125.4 (quat. C, Cp, overlapped with signals from quat. C from Flu), 125.3 (overlapped with toluene), 123.8, 122.3, 120.42, 119.6, 119.5, 119.3 (two signals overlapped), 117.0 (1,8-C, Flu), 106.8 (Cp), 102.2 (Cp), 101.7 (Cp), 93.3 (9-C, Flu), 71.3 (α-C, THF), 40.8 (C(CH$_3$)$_2$), 32.4 (C(CH$_3$)$_3$), 31.2 (C(CH$_3$)$_3$), 29.7 (C(CH$_3$), CMe$_2$), 29.5 (C(CH$_3$), CMe$_2$), 25.0 (β-C, THF). The calculated and experimental values for C$_{29}$H$_{34}$ClOY are respectively of: C, 66.61; H, 6.55 and of C, 66.01; H, 6.87.

Preparation of [(3-tBu-C$_5$H$_3$)—CMe$_2$-Flu]Y(C$_3$H$_5$)(THF).

To a solution of 0.17 g of complex (6) (0.325 mmol) in 20 mL of toluene 0.16 mL of a 2.0 M solution in toluene of allylmagnesium bromide (0.320 mmol) were added. The reaction mixture was stirred for 8 hours at room temperature, the resulting orange solution was filtered and volatiles were removed in vacuum. The orange-yellow crystalline residue was washed twice with 3 mL of with pentane to give 0.12 g of [(3-tBu-C$_5$H$_3$)—CMe$_2$-Flu]Y(C$_3$H$_5$)(THF) (8) with a yield of 69%. The $^1$H NMR spectrum (300 MHz, toluene-d$_8$, 25° C.) was as follows: δ 8.02 (d, 1H, J$_{HH}$=8.6, Flu), 7.95 (d, 1H, J$_{HH}$=8.6, Flu), 7.79 (m, 2H, Flu), 7.15-6.85 (m, 4H overlapped with toluene signals, Flu), 6.20 (q, 1H, J$_{HH}$=12.2, CH$_2$CHCH$_2$), 5.82 (t, 1H, J$_{HH}$=2.7, Cp), 5.73 (t, 1H, J$_{HH}$=2.7, Cp), 5.47 (t, 1H, J$_{HH}$=2.7, Cp), 3.02 (br s, 4H, α-CH$_2$, THF), 2.20 (s, 3H, CMe$_2$), 2.17 (s, 3H, CMe$_2$), 1.83 (br d, 4H, J$_{HH}$=12.2, CH$_2$CHCH$_2$), 1.13 (br s, 4H, (3β-CH$_2$, THF), 1.09 (s, 9H, CCH$_3$), $^{13}$C{$^1$H} NMR (toluene-d$_8$, 75 MHz, 25° C.): δ 149.5 (CH$_2$CHCH$_2$), 139.1 (C-1, quat., Cp) 128.8 (Flu), 126.3 (quat., Flu), 125.5 (quat., Flu), 125.4 (C-3, quat., Cp), 125.2 (Flu), 122.4 (Flu), 122.1 (Flu), 120.5 and 120.4 (Flu), 119.8 and 119.6 (quat., Flu), 117.8 and 117.4 (Flu), 106.4 (Cp), 100.2 (Cp), 99.4 (Cp), 91.5 (C-9, Flu), 71.7 (α-CH$_2$, THF), 70.4 (CH$_2$CHCH$_2$), 40.5 (CMe$_2$), 31.9 (C(CH$_3$)$_3$), 31.6 (C(CH$_3$)$_3$), 29.6 (C(CH$_3$)$_2$), 24.9 (β-CH$_2$, THF). The calculated and experimental values for C$_{32}$H$_{39}$Y were respectively of: C, 72.72; H, 7.44 and of C, 71.96; H, 6.88.

Typical Procedure for the Polymerisation of Styrene.

In the glovebox, a pre-weighted amount of allyl-lanthanide complex of about 15 mg was added to 3.0 mL of styrene (26.0 mmol) and vigorous stirring at the appropriate temperature was immediately started. After a given period of time, the Schlenk tube was opened to air and 1 mL of a 10% solution of HCl in methanol was added to quench the reaction. The polymer precipitated during the polymerisation reaction, was washed repeatedly with about 500 mL of methanol, filtered and dried in vacuum. Experimental parameters and results are displayed in Table I, wherein complexes 2, 4 and 5 are respectively based on yttrium, lanthanum and neodymium.

TABLE I

| Complex | Solvent | St/Ln | T °C. | Time min | Yield % | TOF h$^{-1}$ | Mn (10$^3$) | D | Tm °C. |
|---|---|---|---|---|---|---|---|---|---|
| 2 | — | 800 | 20 | 60 | 4 | 32 | 9 | 5.25 | 252/261 |
| 2 | — | 800 | 20 | 120 | 8 | 32 | 8 | 4.39 | nd |
| 2 | — | 800 | 20 | 300 | 15 | 24 | 11 | 4.29 | 255/263 |
| 2$^e$ | — | 800 | 20 | 60 | 28 | 376 | 17 | 2.05 | 269 |
| 2$^e$ | toluene | 800 | 20 | 120 | 26 | 70 | 15 | 1.40 | 268 |
| 2 | — | 800 | 20 | 120 | 26 | 104 | 24 | 2.27 | 268 |
| 2 | toluene | 800 | 60 | 20 | 8 | 213 | 15 | 1.64 | 253/262 |
| 2 | toluene | 800 | 60 | 40 | 20 | 242 | 19 | 1.84 | 246/262 |
| 2 | toluene | 800 | 60 | 60 | 26 | 208 | 22 | 1.92 | 246/262 |
| 2 | toluene | 800 | 60 | 120 | 41 | 164 | 23 | 2.27 | 253/263 |
| 4 | — | 600 | 20 | 240 | 14 | 21 | 48 | 4.73 | 260 |
| 4 | — | 600 | 60 | 5 | 16 | 1152 | 20 | 1.22 | 257 |
| 5 | — | 700 | 20 | 60 | 33 | 231 | 66 | 1.39 | 252/260 |
| 5 | — | 400 | 20 | 120 | 19 | 38 | nd | nd | nd |
| 5 | — | 500 | 20 | 120 | 19 | 47 | 24 | 4.05 | nd |
| 5 | — | 800 | 50 | 5 | 13 | 1248 | nd | nd | nd |
| 5 | — | 800 | 50 | 5 | 11 | 1056 | 12 | 1.25 | nd |
| 5 | — | 650 | 60 | 2.5 | 6 | 936 | 6 | 1.13 | 256 |
| 5 | — | 600 | 60 | 2.5 | 11 | 1600 | 21 | 1.25 | 262 |
| 5 | — | 600 | 60 | 3 | 15 | 1800 | nd | nd | nd |
| 5 | — | 600 | 60 | 3.5 | 34 | 3500 | 35 | 1.31 | nd |
| 5 | — | 600 | 60 | 4 | 45 | 4050 | 50 | 1.28 | 261 |
| 5 | — | 600 | 60 | 5 | 70 | 5040 | nd | nd | nd |
| 5 | — | 600 | 60 | 5 | 84 | 6048 | 54 | 1.73 | 264 |
| 5 | — | 1100 | 50 | 95 | 59 | 410 | 71 | 2.27 | 265 |
| 5 | — | 2300 | 60 | 5 | 9 | 2484 | 62 | 1.50 | nd |
| 5 | — | 2300 | 60 | 10 | 64 | 7360 | nd | nd | (Tg) 111.6 |
| 5 | — | 2300 | 60 | 10 | 51 | 7038 | nd | nd | nd |
| 5 | — | 2300 | 60 | 30 | 72 | 3312 | 135 | 2.09 | 263 |
| 5 | — | 4000 | 60 | 30 | 28 | 2240 | 128 | 2.60 | nd |
| 5 | c-hex | 600 | 60 | 5 | 32 | 2300 | 30 | 1.42 | nd |
| 5 | toluene | 1100 | 80 | 30 | 5 | 110 | nd | nd | nd |
| 5 | —$^f$ | 600 | 60 | 10 | 20 | 720 | nd | nd | nd |
| 5$^g$ | —$^f$ | 3200 | 60 | 5 | <1 | nd | nd | nd | nd |
| 5$^g$ | — | 3700 | 60 | 60 | 3 | 111 | nd | nd | nd |
| 5 | —$^f$ | 4800 | 60 | 5 | 0 | nd | nd | nd | nd |
| 5$^h$ | — | 600 | 60 | 4 | 15 | 1350 | 51 | 1.99 | nd |
| 5$^f$ | — | 1200 | 60 | 720 | atact | nd | | | |
| 6 | — | 600 | 60 | 5 | 28 | 2050 | 27 | 1.49 | nd |
| 6 | — | 600 | 60 | 15 | 89 | 2130 | 63 | 1.88 | 262 |
| 8 | — | 2000 | 60 | 1440 | 11 | 9 | nd | nd | 261 |

$^e$non recrystallized complex was used.
$^f$introduction of the catalyst as a toluene solution (1 mL) to preheated styrene.
$^g$Al(i-Bu)$_3$ was added in a [Al]/[Nd] ratio of 40.
$^h$introduction of the catalyst as a styrene solution (0.5 mL) to preheated styrene (3 to 5 mL).

Typical Procedure for Ethylene Polymerisation.

50 mL of toluene were introduced in a 300 mL-glass reactor (TOP-Industrie) equipped with a mechanical stirrer rotating at speeds of up to 1500 rpm. The reactor was kept at a temperature of 60° C. Toluene was saturated with ethylene (Air Liquide, N35) at a pressure of from 4 to 8 atmospheres, kept constant via a back-pressure regulator. A solution of 70 mg of allyl-neodymium complex (5) (0.133 mmol) in 10 mL of toluene was transferred via syringe into the reactor under stirring. The ethylene flow rate was monitored using a mass flowmeter (Aalborg, GFM17) connected to a totalising controller (KEP) acting as a flow rate integrator. The reaction was quenched by the addition of 3 mL of a 10% HCl methanol solution to the mixture. The resulting precipitate was filtered, washed with methanol, and dried under vacuum.

Typical Procedure for Ethylene-Styrene Copolymerisation.

A 300 mL-glass reactor (TOP-Industrie) equipped with a mechanical stirrer rotating at speeds of up to 1500 rpm was charged with a mixture of cyclohexane or styrene at a temperature of 60° C. The solution was saturated with ethylene (Air Liquide, N35) at a pressure of 2 to 5 atmospheres, kept constant via a back-pressure regulator. A solution of 70 mg of allyl-neodymium complex (5) (0.133 mmol) in 10 mL of toluene was transferred via syringe into the reactor under stirring. The ethylene flow rate was monitored using a mass flowmeter (Aalborg, GFM17) connected to a totalising controller (KEP) acting as a flow rate integrator. The reaction was quenched by the addition of 3 mL of a 10% HCl methanol solution to the mixture. The resulting precipitate was filtered, washed with methanol, and dried under vacuum. The experimental parameters and results are displayed in Table II.

TABLE II

| Ex | M | Solvent | Monomer A | Comon. B | [A]/[Ln] | T °C. | Press. atm. | Time min. |
|---|---|---|---|---|---|---|---|---|
| 1 | Y | toluene | ethylene | — | — | 80 | 5 | 120 |
| 2 | Nd | toluene | ethylene | — | — | 60 | 5 | 15 |
| 3 | Y-sub | c-hexane | ethylene | — | — | 80 | 8 | 5 |

TABLE II-continued

| Ex | M | Solvent | Monomer A | Comon. B | [A]/[Ln] | T °C. | Press. atm. | Time min. |
|---|---|---|---|---|---|---|---|---|
| 4 | Nd | c-hexane | styrene | ethylene | 600 | 60 | 8 | 120 |
| 5 | Nd | c-hexane | styrene | ethylene | 1100 | 60 | 5 | 20 |
| 6 | Nd | c-hexane | styrene | ethylene | 1300 | 60 | 2 | 120 |
| 7 | Nd | — | styrene | ethylene | 3000 | 60 | 4 | 30 |
| 8 | Nd | — | styrene | ethylene | 3000 | 60 | 1.5 | 20 |
| 9 | Nd | c-hexane | styrene | ethylene | 600 | 60 | 1 | 17 |
| 10 | Nd | c-hexane | styrene | ethylene | 600 | 60 | 1 | 30 |
| 11 | Nd | c-hexane | styrene | ethylene | 600 | 60 | 1 | 20 |
| 12 | Nd | c-hexane | styrene | ethylene | 600 | 80 | 1 | 18 |
| 13 | Nd | c-hexane | styrene | ethylene | 600 | 60 | 1 | 120 |
| 14 | Nd | c-hexane | styrene | ethylene | 600 | 80 | 1 | 120 |
| 15 | Nd | c-hexane | styrene | ethylene | 1300 | 60 | 5 | 120 |
| 16 | Nd | c-hexane | styrene | ethylene | 1300 | 80 | 5 | 30 |
| 17 | Nd | — | styrene | ethylene | 600 | 60 | 1 | 10 |
| 18 | Nd | — | styrene | ethylene | 600 | 60 | 1 | 10 |
| 19 | Nd | — | styrene | ethylene | 600 | 80 | 1 | 5 |
| 20 | Nd | — | styrene | ethylene | 600 | 60 | 5 | 30 |

Y-sub represents complex 8 based on yttrium and wherein the cyclopentadienyl is substituted in position 3 by a t-butyl.

TABLE II cont.

| Example | Yield | Acyivity k/mol·h | A mol % | Mn 10³ | D | Tm °C. | Tg °C. | E MPa |
|---|---|---|---|---|---|---|---|---|
| 1 | 0 | 0 | — | — | — | — | — | — |
| 2 | 0.9 | 24 | 100 | 1 | 1.97 | 128 | nd | nd |
| 3 | 7 | 900 | 100 | nd | nd | nd | nd | nd |
| 4 | 4.1 | 15 | 45 | 21 | 3.10 | nd | 45 | 816 |
| 5 | 11.4 | 240 | 60 | 98 | 1.48 | — | 65 | 1487 |
| 6 | 14.2 | 53 | 78 | 124 | 1.71 | — | 91 | 1807 (25° C.) |
| 7 | 14.5 | 225 | 84 | 137 | 1.79 | — | 70 | 1573 |
| 8 | 9.4 | 218 | >95 | 75 | 2.17 | — | 91 | 1227 (25° C.) |
| 9 | 5.6 | 129 | >95 | nd | nd | 232 | 100 | 1600 (20° C.) |
| 10 | 1.3 | 24 | >95 | nd | nd | 220 | nd | nd |
| 11 | 4.2 | 88 | >95 | nd | nd | 224 | nd | 1632 (20° C.) |
| 12 | 8.4 | 191 | >95 | nd | nd | 241 | nd | 767 (20° C.) |
| 13 | 7.4 | 26 | 90 | nd | nd | nd | 100 | 2057 (20° C.) |
| 14 | 7.4 | 24 | 82 | nd | nd | nd | nd | 995 (20° C.) |
| 15 | 6 | 15 | 83 | nd | nd | nd | nd | nd |
| 16 | 10.6 | 108 | 76 | nd | nd | nd | nd | nd |
| 17 | 3.7 | 149 | >95 | nd | nd | nd | 52 | 818 (20° C.) |
| 18 | 6.8 | 277 | >95 | nd | nd | nd | 85 | 1273 (20° C.) |
| 19 | 10.6 | 850 | >95 | nd | nd | 223 | 66 | 1165 (20° C.) |
| 20 | 11.2 | 152 | 90 | nd | nd | nd | 67 | 2123 (20° C.) |

Figure 12:
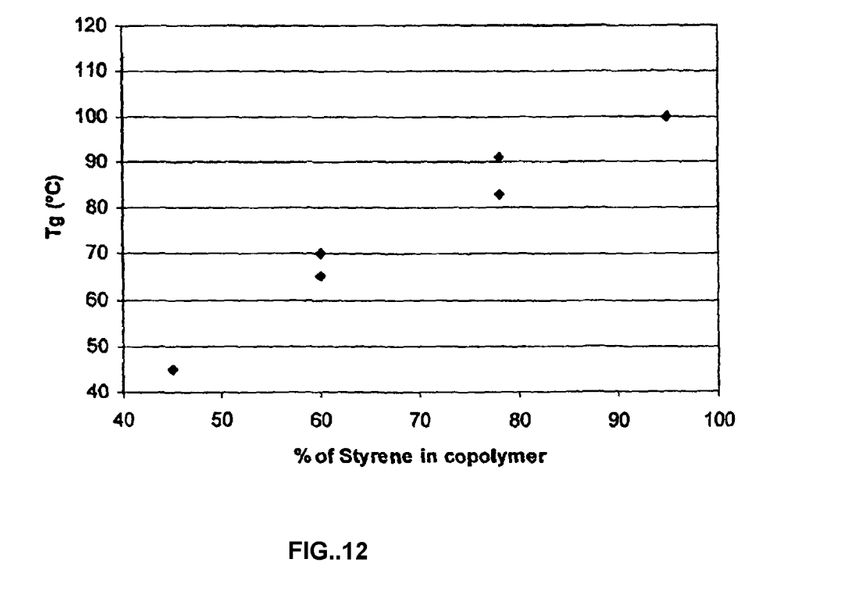
FIG. 12 represents the glass transition temperature Tg expressed in ° C. as a function of styrene content expressed in mol % in the styrene-ethylene copolymer.

From this table, it appears as discussed in the description that the value of the Young's modulus is in part determined by the solvent and the polymerisation conditions. Examples 4, 5 and 6 were carried out with the same complex based on neodymium, in cyclohexane as solvent and with increasing amounts of styrene of respectively 45, 60, 78 mol %. The Young's modulus E and the glass transition temperature $T_9$ were seen to increase with increasing amounts of styrene. This behaviour can be seen in FIG. 12 representing the glass transition temperature as a function of styrene content in the copolymer. Examples 1 and 8 were carried out with the same neodymium complex as examples 4, 5 and 6, but the polymerisation was carried out in bulk (without additional solvent). The Young's modulus and glass transition temperature also increased with increasing amount of styrene, but they were smaller than those obtained when cyclohexane was used as solvent during polymerisation. The most important effect however is the decrease of the melting temperature Tm of styrene-ethylene copolymers containing at least 95 mol % of styrene, with respect to that of pure syndiotactic polystyrene. The melting temperature of syndiotactic polystyrene typically ranges from 255 to 270° C. It can be seen in Table II that examples 9 to 12 containing more than 95 mol % of styrene have a melting temperature of 220 to 240° C. These copolymers thus have the advantageous properties of syndiotactic polystyrene without having its difficult processability. It is speculated that the amount of ethylene present in the styrene-ethylene copolymer could be accurately derived from the melting temperature of the copolymer.

13C(1H) NMR for the integration.

The NMR spectra of the polymer were recorded at 25° C. in CDCl$_3$, using a Bruker AC300 spectrometer operating at 75 MHz. The spectrometer was operated using the following parameters: inversed gated decoupling; pulse width, 56°; acquisition time, 1.04 s; delay, 12 s; number of scans, 5100.

The invention claimed is:

1. A styrene ethylene copolymer having syndiotactic styrene blocks prepared by the copolymerization of ethylene and styrene in the presence of a catalyst system comprising a metallocene catalyst component characterized by the formula:

(FluR"Cp)M($\eta^3$C$_3$R'$_5$)(ether)$_n$ wherein Cp is a substituted or unsubstituted cyclopentadienyl group, Flu is a substituted or unsubstituted fluorenyl group, R" is a structural bridge between Cp and Flu imparting stereorigidity to the component, M is a metal Group III of the Periodic Table, each R' is the same or different and is hydrogen, a silyl group of a hydrocarbyl group having from 1 to 20 carbon atoms and n is 0, 1 or 2 said copolymer containing styrene in an amount within the range of 40-99% of styrene.

2. The copolymer of claim 1 wherein said copolymer comprises syndiotactic polystyrene blocks separated by single ethylene units dispersed in the chain of said ethylene styrene copolymer wherein said copolymer comprises an alternating ethylene-styrene structure having a styrene content within the range 45-90 mol percent styrene.

3. The copolymer of claim 2 wherein said styrene ethylene copolymer contains 75-90 mol percent of styrene.

4. The copolymer of claim 2 wherein said styrene ethylene copolymer contains from 85-90 mol percent of styrene.

5. The copolymer of claim 2 wherein said metallocene catalyst component is characterized by M being selected from the group consisting of yttrium, lanthanum, neodymium and samarium.

6. The copolymer of claim 1 wherein said copolymer has an average of molecular weight of from 10,000 to 200,000 and a polydispersity of from 1.1 to 3.5.

7. The composition of claim 6 wherein said copolymer has a polydispersity of from 1.2 to 3.

8. The composition of claim 7 wherein said copolymer has a polydispersity of from 1.4-1.85.

9. A styrene ethylene copolymer having syndiotactic styrene blocks prepared by the copolymerization of ethylene and styrene in the presence of a catalyst system comprising a metallocene catalyst component characterized by the formula:

$$(FluR''Cp)M(\eta^3C_3R'_5)(ether)_n$$

wherein Cp is a substituted or unsubstituted cyclopentadienyl group, Flu is a substituted or unsubstituted fluorenyl group, R'' is a structural bridge between Cp and Flu imparting stereorigidity to the component, M is a metal from Group III of the Periodic Table, each R' is the same or different and is hydrogen, a silyl group of a hydrocarbyl group having from 1 to 20 carbon atoms and n is 0, 1 or 2 said copolymer containing styrene in an amount within the range of 90-99.5 mol % of styrene.

10. The copolymer of claim 9 wherein said copolymer comprises syndiotactic polystyrene blocks separated by single ethylene units dispersed in the chain of said ethylene styrene copolymer.

11. The copolymer of claim 9 wherein said copolymer contains styrene in the amount within the range of 95-99 mol percent of said copolymer.

12. The copolymer of claim 11 wherein said copolymer has a melting temperature within the range of 220-240° C.

13. The copolymer of claim 9 wherein said syndiotactic styrene blocks comprise at least 90% rrrr pentads.

14. The copolymer of claim 13 wherein said copolymer has a rrrr pentad content of at least 95%.

15. A method for the copolymerization of styrene and ethylene to produce an ethylene styrene copolymer comprising providing a catalyst system catalyst component characterized by the formula $$(FluR''Cp)M(\eta^3C_3R'_5)(ether)_n$$

wherein Cp is a substituted or unsubstituted cyclopentadienyl group, Flu is a substituted or unsubstituted fluorenyl group, R'' is a structural bridge between Cp and Flu imparting stereorigidity to the component, M is a metal from Group III of the Periodic Table, each R' is the same or different and is hydrogen, a silyl group of a hydrocarbyl group having from 1 to 20 carbon atoms and n is 0, 1 or 2;

introducing styrene monomer and ethylene copolymer in an amount in which the styrene monomer is present in said feedstream in an amount within the range of 90-99.5 mol percent;

maintaining said polymerization reaction zone under polymerization conditions to copolymerize styrene and ethylene in the presence of said catalyst system;

recovering a styrene ethylene copolymer having syndiotactic polystyrene blocks from said polymerization reaction zone.

16. The method of claim 15 wherein said polymerization reaction zone is operated at a polymerization temperature within the range of 10-120° C.

17. The method of claim 16 wherein said polymerization temperature is within the range of 15-80° C.

18. The method of claim 16 wherein said polymerization temperature is within the range of 20-60° C.

19. The process of claim 15 wherein said metallocene catalyst component is characterized by M being selected from the group consisting of yttrium, lanthanum, neodymium and samarium.

20. The method of claim 19 wherein said metallocene catalyst component is characterized by M being samarium or neodymium.

21. The method of claim 18 wherein said metallocene catalyst component is characterized by M being neodymium.

* * * * *